(12) United States Patent
Tong et al.

(10) Patent No.: US 9,564,665 B2
(45) Date of Patent: Feb. 7, 2017

(54) ELECTRICITY SUPPLY SYSTEM

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Zhiwei Tong, Guangdong (CN); Jianhua Zhu, Guangdong (CN); Zhipei Lu, Guangdong (CN); Qing Lai, Guangdong (CN)

(73) Assignees: BYD Company Limited, Shenzhen, Guangdong (CN); Shenzhen BYD Auto R&D Company Limited, Shenzhen, Guangdong (CN)

( * ) Notice: Subject to any disclaimer, the term of this patent is extended or adjusted under 35 U.S.C. 154(b) by 300 days.

(21) Appl. No.: 14/166,551

(22) Filed: Jan. 28, 2014

(65) Prior Publication Data
US 2014/0197777 A1    Jul. 17, 2014

Related U.S. Application Data

(63) Continuation of application No. PCT/CN2012/078729, filed on Jul. 16, 2012.

(30) Foreign Application Priority Data

Jul. 29, 2011  (CN) .................... 2011 2 0273473 U

(51) Int. Cl.
*H02J 7/00* (2006.01)
*H01M 10/637* (2014.01)
(Continued)

(52) U.S. Cl.
CPC ...... *H01M 10/5026* (2013.01); *B60L 11/1866* (2013.01); *B60L 11/1875* (2013.01);
(Continued)

(58) Field of Classification Search
USPC .................................................. 320/103, 104
See application file for complete search history.

(56) References Cited

U.S. PATENT DOCUMENTS

| 5,666,040 A | 9/1997 | Bourbeau |
| 2003/0152830 A1 | 8/2003 | Eaves |

(Continued)

FOREIGN PATENT DOCUMENTS

| CN | 101091299 A | 12/2007 |
| CN | 101362427 A | 2/2009 |

(Continued)

OTHER PUBLICATIONS

PCT International Search Report and Written Opinion mailed Oct. 18, 2012, issued in International Application No. PCT/CN2012/078729 (14 pages).

*Primary Examiner* — Samuel Berhanu
(74) *Attorney, Agent, or Firm* — Finnegan, Henderson, Farabow, Garrett & Dunner, LLP

(57) ABSTRACT

An electricity supply system comprises: a battery module, a control module, and a distribution box. The battery module includes at least two in-series modules, each comprising at least two battery groups connected in series. The control module is connected with the battery module and includes an IGBT module, a relay module, and a relay control module. The relay module includes a plurality of relays K. Each in-series module is connected to the relay module. The relay module is connected to the IGBT module. The relay control module is configured for controlling ON or OFF of each relay K so as to select an in-series module to work with the IGBT module. The distribution box is connected with the control module.

15 Claims, 3 Drawing Sheets

(51) Int. Cl.
*H01M 10/42* (2006.01)
*B60L 11/18* (2006.01)
*H01M 10/625* (2014.01)
*H01M 10/615* (2014.01)
*H01M 10/0525* (2010.01)

(52) U.S. Cl.
CPC ..... *H01M 10/4207* (2013.01); *H01M 10/615* (2015.04); *H01M 10/625* (2015.04); *H01M 10/637* (2015.04); *H02J 7/0014* (2013.01); *H02J 7/0019* (2013.01); *H02J 7/0029* (2013.01); *H02J 7/0054* (2013.01); *B60L 2240/545* (2013.01); *B60L 2240/547* (2013.01); *H01M 10/0525* (2013.01); *H01M 2220/20* (2013.01); *Y02T 10/7005* (2013.01); *Y02T 10/7011* (2013.01); *Y02T 10/7061* (2013.01)

(56) References Cited

U.S. PATENT DOCUMENTS

| | | |
|---|---|---|
| 2007/0160900 A1 | 7/2007 | Nollet |
| 2011/0144861 A1 | 6/2011 | Lakirovich et al. |
| 2012/0013180 A1 | 1/2012 | Muto et al. |
| 2012/0268070 A1* | 10/2012 | Park .......... H01M 10/441 320/126 |

FOREIGN PATENT DOCUMENTS

| | | |
|---|---|---|
| CN | 201805259 U | 4/2011 |
| CN | 102088117 A | 6/2011 |
| CN | 202178590 U | 3/2012 |
| EP | 2413455 A1 | 2/2012 |
| JP | 2007-195272 A | 8/2007 |
| JP | 2008-199743 A | 8/2008 |
| JP | 2009-284606 A | 12/2009 |
| JP | 2010-104179 A | 5/2010 |
| KR | 20080033970 A | 4/2008 |
| WO | WO 2007-007655 A1 | 1/2007 |
| WO | WO 2010/145439 A1 | 12/2010 |
| WO | WO 2013/017015 A1 | 2/2013 |

* cited by examiner

ELECTRICITY SUPPLY SYSTEM

CROSS-REFERENCE TO RELATED APPLICATION

This application is a continuation application of International Application No. PCT/CN2012/078729, filed Jul. 16, 2012, which claims priority to and benefits of Chinese Patent Application Serial No. 201120273473.0, filed with the State Intellectual Property Office of P. R. China on Jul. 29, 2011. The entire contents of the above-referenced applications are incorporated herein by reference.

FIELD

The present disclosure relates to an electricity supply field, and more particularly to a battery electricity supply system.

BACKGROUND

One of core components of an electric vehicle is battery. Some electric vehicles use lithium ion batteries. Performance of a lithium ion battery is generally poor at a low temperature. Thus, it is required to heat the lithium ion battery. An electric vehicle battery heating system has become a technical challenge. An in-series IGBT (insulated gate bipolar transistor) heating is one of conventional methods for heating an electric vehicle battery.

Because electric vehicle batteries are mostly configured in series to form a battery pack, for the IGBT heating, the IGBT is connected with the battery pack in series, and the battery pack is heated via a pulse current which is generated by an instant short circuit of the entire battery pack. If a performance of the battery is poor, a pulse short circuit current may not be overlarge (for instance, less than 3000 A) because of a large resistance of the battery, thus an entire pack in-series IGBT heating is feasible. However, with an improvement of the performance of the battery, the resistance of the battery is greatly decreased so that the pulse short circuit current of a hybrid vehicle battery pack may be 5000 A, and that of a pure electric vehicle battery pack may be 7000 A, which are too large for the IGBT, a fuse plug and the battery itself.

In addition, on one hand, because the battery pack generally includes hundreds of batteries connected in series, a non-uniform discharge of each single battery may be caused during a repeated charge-discharge process, which may cause a capacity loss of the battery pack; and on the other hand, for the in-series IGBT heating, a discharge difference may be caused because of different battery groups, thus a voltage difference of the battery pack may be caused accordingly.

SUMMARY

The present disclosure is aimed to solve at least one of the problems, particularly a defect of an overlarge current, which may cause a life loss of a battery, electronic devices, and components, in a conventional in-series IGBT heating process. Accordingly, an electricity supply may need to be provided, which may realize heating in batches and avoid the overlarge current.

According to an embodiment of the present disclosure, an electricity supply system is provided. The electricity supply system comprises: a battery module, a control module, and a distribution box. The battery module includes at least two in-series modules, each in-series module comprising at least two battery groups connected in series. The control module is connected with the battery module and includes: an IGBT module, a relay module, and a relay control module. The relay module includes a plurality of relays, in which each in-series module is connected to the relay module, and the relay module is connected to the IGBT module. The relay control module is configured for controlling an ON or OFF of each relay so as to select an in-series module to work with the IGBT module. The distribution box is connected with the control module.

In one embodiment, the battery module comprises: one first battery group connected with the distribution box via a first relay which is connected with the first battery group in series; a plurality of middle battery groups, each middle battery group connected with the distribution box via a second relay which is connected with the each middle battery group in series, and connected with the IGBT module via a third relay which is connected with the middle battery group in series; and one last battery group connected with the IGBT module via a fourth relay which is connected with the last battery group in series, in which the first battery group, the plurality of middle battery groups and the last battery group belong to the at least two in-series modules, the IGBT module is connected with the distribution box, and two adjacent in-series modules are connected via a fifth relay.

In one embodiment, each in-series module comprises two battery groups connected in series.

In one embodiment, the relay includes an electromagnetic relay.

In one embodiment, the relay control module includes a single-chip microcomputer.

According to an embodiment of the present disclosure, a method for heating a battery group is provided. The method for heating a battery group comprises: configuring a battery module to comprise at least two in-series modules, wherein each of the at least two in-series modules comprises at least two battery groups connected in series; configuring a control module comprising an IGBT module, a relay module and a relay control module, wherein the relay module is configured to comprise a plurality of relays, each in-series module is connected to the relay module, and the relay module is connected to the IGBT module, the relay control module is configured to control an ON or OFF of each relay so as to select an in-series module to work with the IGBT module; and configuring a distribution box to connect with the IGBT module and the relay module respectively.

In one embodiment, the battery module is configured to comprise: one first battery group connected with the distribution box via a first relay which is connected with the first battery group in series; a plurality of middle battery groups, each middle battery group connected with the distribution box via a second relay which is connected with the each middle battery group in series, and connected with the IGBT module via a third relay which is connected with the middle battery group in series; and one last battery group connected with the IGBT module via a fourth relay which is connected with the last battery group in series, in which the first battery group, the plurality of middle battery groups and the last battery group belong to the at least two in-series modules, the IGBT module is connected with the distribution box, and two adjacent in-series modules are connected via a fifth relay.

In one embodiment, the method comprises: connecting an in-series module having a maximum voltage and an in-series module having a minimum voltage in parallel so as to realize an equilibrium of voltage.

In one embodiment, each in-series module is configured to comprise a first battery group and a second battery group connected in series.

In one embodiment, the method comprises: configuring a relay control module to control an ON or OFF of each relay so as to connect a first battery group in a first in-series module to the distribution box directly and to connect a second battery group in the first in-series module to the distribution box via the IGBT module.

In one embodiment, the method comprises: configuring a relay control module to control an ON or OFF of each relay so as to connect a first battery group in a first in-series module to the distribution box directly, and to connect a second battery group in a second in-series module to the distribution box via the IGBT module, wherein the first battery group in the first in-series module, a second battery group in the first in-series module, a first battery group in the second in-series module and the second battery group in the second in-series module are connected in series.

In one embodiment, the relay is an electromagnetic relay.

In one embodiment, the relay control module is a single-chip microcomputer.

Compared with a conventional entire pack in-series IGBT heating system, the electricity supply system and the method for heating a battery group provided by the present disclosure have advantages as follows.

(1) The electricity supply system may realize heating battery groups in batches, thus, a maximum current may retain ranging from 2500 A to 3000 A, which may not damage performances of the battery itself and other electronic devices and components.

(2) The electricity supply system may realize an equilibrium of voltage between battery groups, and a parallel equilibrium voltage between a high voltage battery group and a low voltage battery group.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
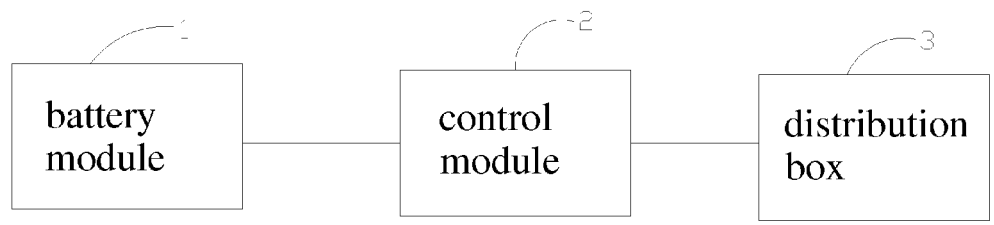
FIG. 1 is a block diagram showing an electricity supply system according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Figure 2:
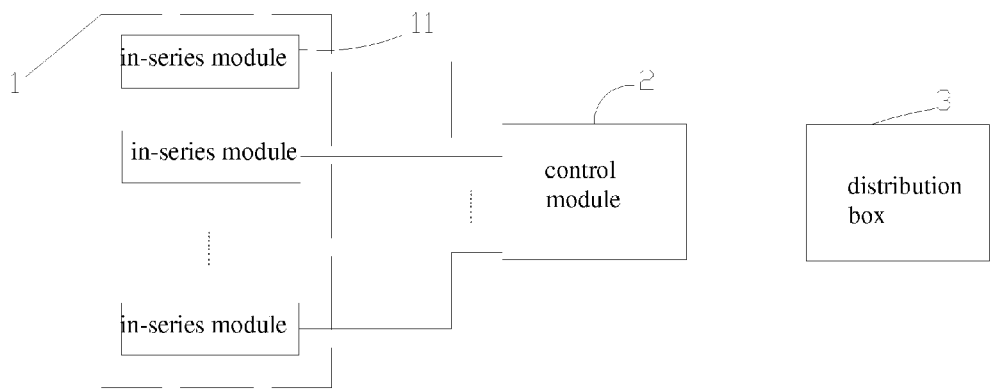
FIG. 2 is a schematic diagram showing a connection of in-series modules according to an embodiment of the present disclosure.
Figure 3:
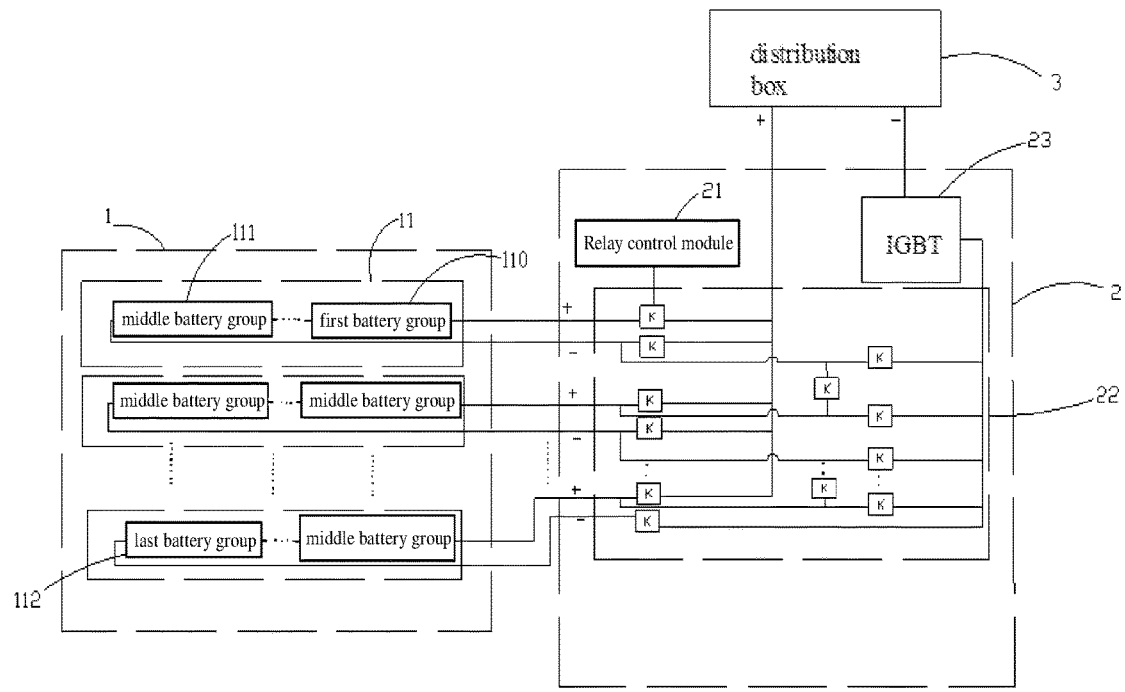
FIG. 3 is a schematic diagram showing a connection of a battery module and a control module according to an embodiment of the present disclosure.

FIG. 1 is a block diagram of an electricity supply system according to an embodiment of the present disclosure. As shown in FIG. 1, the electricity supply system comprises: a battery module 1, a control module 2, and a distribution box 3. The battery module 1 is connected with the control module 2, and the control module 2 is connected with the distribution box 3. FIG. 2 is a schematic diagram showing a connection of in-series modules according to an embodiment of the present disclosure. As shown in FIG. 2, the battery module 1 comprises at least two in-series modules 11. FIG. 3 is a schematic diagram showing a connection of a battery module and a control module according to an embodiment of the present disclosure. As shown in FIG. 3, each in-series module 11 comprises at least two battery groups connected in series. Each in-series module 11 may comprise two or more battery groups connected in series, and the number of the battery groups included in each in-series module 11 may depend on requirements of the electricity supply system. Similarly, the battery module 1 may comprise two or more in-series modules 11, and the number of in-series module 11 also may depend on requirements of the electricity supply system.

As shown in FIG. 3, the control module 2 comprises: a relay module 22, a relay control module 21 and an IGBT module 23. The relay module 22 comprises a plurality of relays K. Each in-series module 11 is connected to the relay module 22, and the relay module 22 is connected to the IGBT module 23. The relay control module 21 is configured for controlling an ON or OFF of each relay K so as to select an in-series module 11 to work with the IGBT module 23. The electricity supply system may realize heating the battery groups in batches and an equilibrium of voltage. The control module 2 may be triggered to work by an external signal, which is determined according conditions of actual uses.

Further as shown in FIG. 3, the battery module 1 comprises: one first battery group 110, one last battery group 112 and a plurality of middle battery groups 111. The first battery group 110, the plurality of middle battery groups 111 and the last battery group 112 belong to the in-series modules 11. The first battery group 110 is connected with the distribution box 3 via a relay K, which is connected with the first battery group 110 in series. Each middle battery group 111 is connected with the distribution box 3 via a relay K, which is connected with the middle battery group in series. Each middle battery group 111 is also connected with the IGBT module 23 via a relay K, which is connected with the middle battery group 111 in series. The last battery group 112 is connected with the IGBT module 23 via a relay K, which is connected with the last battery group 112 in series. In summary, in this exemplary embodiment, the battery module 1 comprises: one first battery group 110 only connected with the distribution box 3, one last battery group 112 only connected with the IGBT module 23, and a plurality of middle battery groups 111 connected with both the distribution box 3 and the IGBT module 23.

In one embodiment, the IGBT module 23 is connected with the distribution box 3, and two adjacent in-series modules 11 are connected via a relay K.

In one embodiment, each in-series module 11 may comprise two battery groups connected in series. However, the number of battery groups may be different from two, which is selected according to the conditions of actual uses.

In one embodiment, the relay may be an electromagnetic relay. It should be noted that to those skilled in the art, any other relays which may achieve a same performance may be used.

In one embodiment, the relay control module 21 may be a PLC (Programmable logic Controller), a SCM (single-chip microcomputer) or any other control module. The SCM is used in this embodiment.

For an IGBT heating system, an external circuit may be quickly closed or opened by an IGBT circuit, which may realize an instant short circuit of the battery, a time of which generally lasts about 1-2 minutes. Under a condition of a same pulse width of a pulse current, the pulse current and the heat generated by the pulse current, both depend on a voltage and a resistance of the battery. Such IGBT circuit which is known by those skilled in the art, will not be described in detail here. The present disclosure primarily optimizes a structure of the external circuit, thus allowing the battery groups to be heated in batches so as to avoid an overlarge instant short current generated at a heating instant and to prevent circuit devices from being damaged.

In addition, the distribution box 3, which is one of core components of the electric vehicle, is configured for controlling and distributing an output of the battery module 1. A controlling and distributing method of the distribution box which is known by those skilled in the art, will not be described in detail here.

Figure 4:
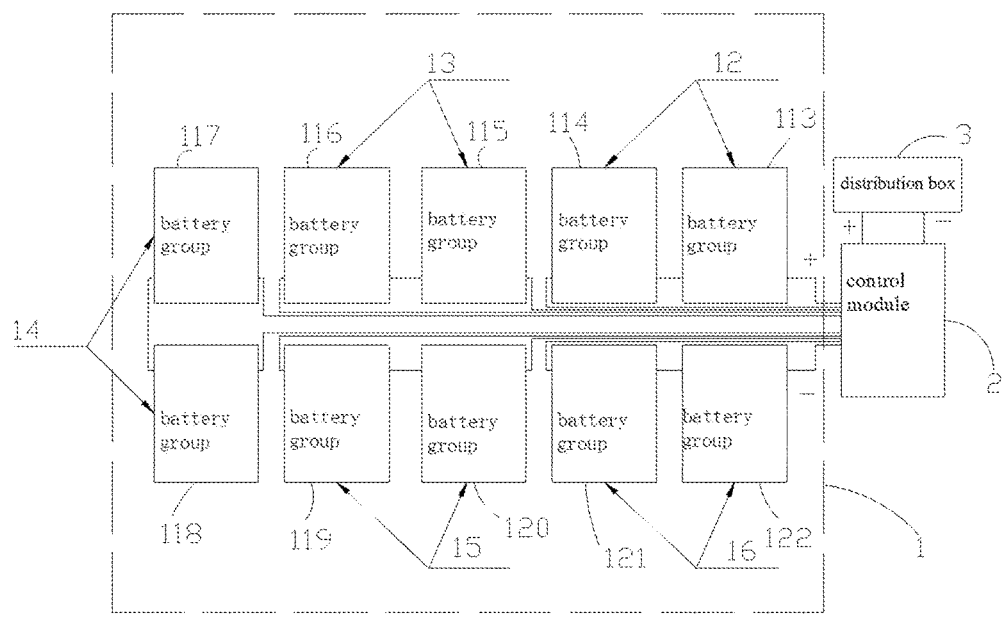
FIG. 4 is a schematic diagram showing a structure of the battery module according to an embodiment of the present disclosure.
Figure 5:
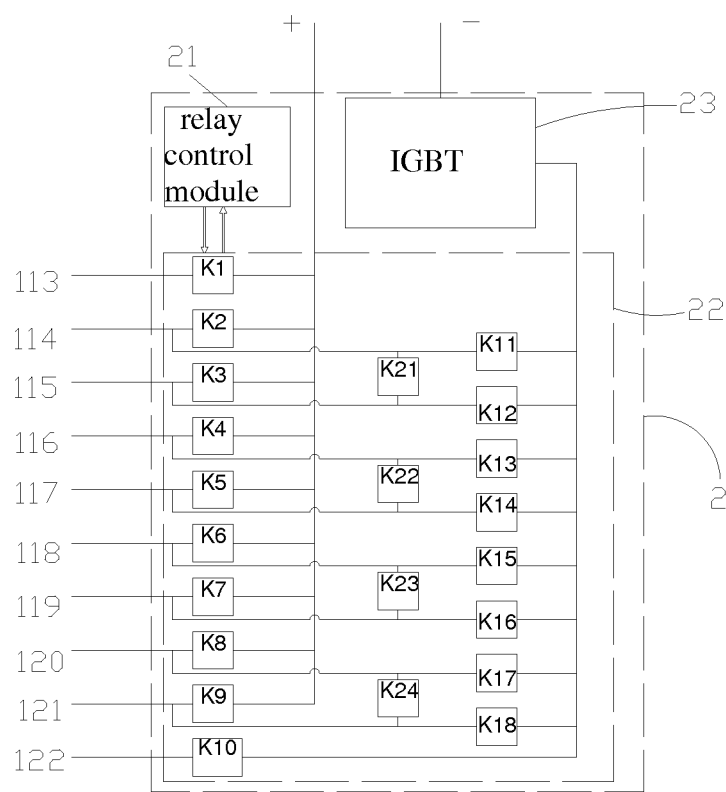
FIG. 5 is a schematic diagram showing a structure of the control module according to an embodiment of the present disclosure.

FIG. 4 is a schematic diagram showing a structure of the battery module according to an embodiment of the present disclosure and FIG. 5 is a schematic diagram showing a structure of the control module according to an embodiment of the present disclosure. Specific circuit connections will be illustrated with reference to FIG. 4 and FIG. 5.

A cathode of the battery group 113 (i.e. the first battery group) is connected with a positive outlet terminal of the control module 2 via a relay K1. An anode of the battery group 114 (i.e. one of the middle battery groups) is connected with the positive outlet terminal of the control module 2 via a relay K2, and the battery group 114 is connected with the IGBT module 23 via a relay K11.

A cathode of the battery group 115 (i.e. one of the middle battery groups) is connected with the positive outlet terminal of the control module 2 via a relay K3, and the battery group 115 is connected with the IGBT module 23 via a relay K12. An anode of the battery group 116 (i.e. one of the middle battery groups) is connected with the positive outlet terminal of the control module 2 via a relay K4, and the battery group 116 is connected with the IGBT module 23 via a relay K13.

A cathode of the battery group 117 (i.e. one of the middle battery groups) is connected with the positive outlet terminal of the control module 2 via a relay K5, and the battery group 117 is connected with the IGBT module 23 via a relay K14. An anode of the battery group 118 (i.e. one of the middle battery groups) is connected with the positive outlet terminal of the control module 2 via a relay K6, and the battery group 118 is connected with the IGBT module 23 via a relay K15.

A cathode of the battery group 119 (i.e. one of the middle battery groups) is connected with the positive outlet terminal of the control module 2 via a relay K7, and the battery group 119 is connected with the IGBT module 23 via a relay K16.

An anode of the battery group 120 (i.e. one of the middle battery groups) is connected with the positive outlet terminal of the control module 2 via a relay K8, and the battery group 120 is connected with the IGBT module 23 via a relay K17.

A cathode of the battery group 121 (i.e. one of the middle battery groups) is connected with the positive outlet terminal of the control module 2 via a relay K9, and the battery group 121 is connected with the IGBT module 23 via a relay K18. An anode of the battery group 122 (i.e. the last battery group) is connected with the IGBT module 23 via a relay K10.

The battery group 114 and the battery group 115 are connected in series via a relay K21. The battery group 116 and the battery group 117 are connected in series via a relay K22. The battery group 118 and the battery group 119 are connected in series via a relay K23. The battery group 120 and the battery group 121 are connected in series via a relay K24.

An operation method of the electricity supply system may be illustrated below.

(1) The system may realize an in-series connection of battery groups so as to supply power to the electric vehicle.

The battery group 113 and the battery group 114, the battery group 115 and the battery group 116, the battery group 117 and the battery group 118, the battery group 119 and the battery group 120, the battery group 121 and the battery group 122 are connected in series and in pairs respectively via inter-module connecting sheets. The relay K21, the relay K22, the relay K23 and the relay K24 are on to allow in-series connections between the battery group 114 and the battery group 115, the battery group 116 and the battery group 117, the battery group 118 and the battery group 119, the battery group 120 and the battery group 121. Therefore, when the relay K1, the relay K21, the relay K22, the relay K23, the relay K24 and the relay K10 are on, and the other relays are off, an anode of the battery module 1 is connected with the positive outlet terminal of the control module 2, and a cathode of the battery module 1 is connected with the IGBT module 23, to realize a power supply for the entire electric vehicle by the battery module.

(2) The system may realize a connection of two or four adjacent battery groups with the control module 2, and a heat of two or four adjacent battery groups sequentially.

Heating two adjacent battery groups may be conducted as follows.

The relay K1 and the relay K11 are on, and the other relays are off so that the battery group 113 and the battery group 114 are connected with the positive outlet terminal of the control module 2 and the IGBT module 23. Thus, the battery group 113 and the battery group 114 are heated via the IGBT module 23.

The relay K3 and the relay K13 are on, and the other relays are off so that the battery group 115 and the battery group 116 are connected with the positive outlet terminal of the control module 2 and the IGBT module 23. Thus, the battery group 115 and the battery group 116 are heated via the IGBT module 23.

The relay K5 and the relay K15 are on, and the other relays are off so that the battery group 117 and the battery group 118 are connected with the positive outlet terminal of the control module 2 and the IGBT module 23. Thus, the battery group 117 and the battery group 118 are heated via the IGBT module 23.

The relay K7 and the relay K17 are on, and the other relays are off so that the battery group 119 and the battery group 120 are connected with the positive outlet terminal of the control module 2 and the IGBT module 23. Thus, the battery group 119 and the battery group 120 are heated via the IGBT module 23.

The relay K9 and the relay K10 are on, and the other relays are off so that the battery group 121 and the battery group 122 are connected with the positive outlet terminal of the control module 2 and the IGBT module 23. Thus, the battery group 121 and the battery group 122 are heated via the IGBT module 23.

Heating four adjacent battery groups may be conducted as follows.

The relay K1, the relay K13 and the relay K21 are on, and the other relays are off so that the battery group 113, the battery group 114, the battery group 115 and the battery group 116 are connected with the positive outlet terminal of the control module 2 and the IGBT module 23. Thus, the battery group 113, the battery group 114, the battery group 115 and the battery group 116 are heated via the IGBT module 23.

The relay K3, the relay K15 and the relay K22 are on, and the other relays are off so that the battery group 115, the battery group 116, the battery group 117 and the battery group 118 are connected with the positive outlet terminal of the control module 2 and the IGBT module 23. Thus, the battery group 115, the battery group 116, the battery group 117 and the battery group 118 are heated via the IGBT module 23.

The relay K5, the relay K17 and the relay K23 are on, and the other relays are off so that the battery group 117, the battery group 118, the battery group 119 and the battery group 120 are connected with the positive outlet terminal of the control module 2 and the IGBT module 23. Thus, the battery group 117, the battery group 118, the battery group 119 and the battery group 120 are heated via the IGBT module 23.

The relay K7, the relay K10 and the relay K24 are on, and the other relays are off so that the battery group 119, the battery group 120, the battery group 121 and the battery group 122 are connected with the positive outlet terminal of the control module 2 and the IGBT module 23. Thus, the battery group 119, the battery group 120, the battery group 121 and the battery group 122 are heated via the IGBT module 23.

It should be noted that, besides simultaneously heating two or four battery groups, any quantity of battery groups may be heated simultaneously.

(3) The system may realize an equilibrium of a voltage between battery groups.

The battery group 113 and the battery group 114, the battery group 115 and the battery group 116, the battery group 117 and the battery group 118, the battery group 119 and the battery group 120, the battery group 121 and the battery group 122 are connected in series and in pairs respectively to form the in-series module 12, the in-series module 13, the in-series module 14, the in-series module 15 and the in-series module 16 respectively. Because any two in-series modules may be connected in parallel, when a voltage equilibrium is needed, according to voltage signals inputted, an in-series module having a maximum voltage and an in-series module having a minimum voltage may be connected in parallel so as to realize the equilibrium of voltage.

Methods for realizing the equilibrium of voltage may be illustrated as follows.

In order to realize the equilibrium of voltage between the in-series module 12 and the in-series module 13, the relay K1, the relay K11, the relay K3 and the relay K13 are on, and the other relays are off so that the in-series module 12 and the in-series module 13 are connected in parallel.

In order to realize the equilibrium of voltage between the in-series module 12 and the in-series module 14, the relay K1, the relay K11, the relay K5 and the relay K15 are on, and the other relays are off so that the in-series module 12 and the in-series module 14 are connected in parallel.

In order to realize the equilibrium of voltage between the in-series module 12 and the in-series module 15, the relay K1, the relay K11, the relay K7 and the relay K17 are on, and the other relays are off so that the in-series module 12 and the in-series module 15 are connected in parallel.

In order to realize the equilibrium of voltage between the in-series module 12 and the in-series module 16, the relay K1, the relay K11, the relay K9 and the relay K10 are on, and the other relays are off so that the in-series module 12 and the in-series module 16 are connected in parallel.

In order to realize the equilibrium of voltage between the in-series module 13 and the in-series module 14, the relay K3, the relay K13, the relay K5 and the relay K15 are on, and the other relays are off so that the in-series module 13 and the in-series module 14 are connected in parallel.

In order to realize the equilibrium of voltage between the in-series module 13 and the in-series module 15, the relay K3, the relay K13, the relay K7 and the relay K17 are on, and the other relays are off so that the in-series module 13 and the in-series module 15 are connected in parallel.

In order to realize the equilibrium of voltage between the in-series module 13 and the in-series module 16, the relay K3, the relay K13, the relay K9 and the relay K10 are on, and the other relays are off so that the in-series module 13 and the in-series module 16 are connected in parallel.

In order to realize the equilibrium of voltage between the in-series module 14 and the in-series module 15, the relay K5, the relay K15, the relay K7 and the relay K17 are on, and the other relays are off so that the in-series module 14 and the in-series module 15 are connected in parallel.

In order to realize the equilibrium of voltage between the in-series module 14 and the in-series module 16, the relay K5, the relay K15, the relay K9 and the relay K10 are on, and the other relays are off so that the in-series module 14 and the in-series module 16 are connected in parallel.

In order to realize the equilibrium of voltage between the in-series module 15 and the in-series module 16, the relay K7, the relay K17, the relay K9 and the relay K10 are on, and the other relays are off so that the in-series module 15 and the in-series module 16 are connected in parallel.

According to the embodiments above, the electricity supply system may realize the in-series connection of all battery groups to supply power, heating of any quantity of battery groups sequentially, and a parallel equilibrium voltage between any two of the in-series module 12, the in-series module 13, the in-series module 14, the in-series module 15 and the in-series module 16.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:
1. An electricity supply system, comprising:
  a battery module, comprising at least two in-series modules, each in-series module comprising at least two battery groups connected in series;

a control module connected with the battery module, comprising:
an insulated gate bipolar transistor (IGBT) module,
a relay module comprising a plurality of relays, wherein each in-series module is connected to the relay module, and the relay module is directly connected to the IGBT module, and
a relay control module configured for controlling ON or OFF of each relay so as to select one or more in-series module to work with the IGBT module; and
a distribution box directly connected with the control module;
wherein the IGBT module is directly connected with the distribution box.

2. The electricity supply system according to claim 1, wherein the battery group comprises:
a first battery group connected with the distribution box via a first relay, which is connected with the first battery group in series;
a plurality of middle battery groups, each middle battery group connected with the distribution box via a second relay, which is connected with the middle battery group in series, and connected with the IGBT module via a third relay, which is connected with the middle battery group in series; and
a last battery group connected with the IGBT module via a fourth relay, which is connected with the last battery group in series.

3. The electricity supply system according to claim 1, wherein each in-series module comprises two battery groups connected in series.

4. The electricity supply system according to claim 1, wherein the relay includes an electromagnetic relay.

5. The electricity supply system according to claim 1, wherein the relay control module includes a single-chip microcomputer.

6. The electricity supply system according to claim 1, wherein two adjacent in-series modules are connected via a relay.

7. A method for heating a battery group, comprising:
configuring a battery module to comprise at least two in-series modules, wherein each of the at least two in-series modules comprises at least two battery groups connected in series;
configuring a control module comprising an insulated gate bipolar transistor (IGBT) module, a relay module and a relay control module, wherein:
the relay module is configured to comprise a plurality of relays,
each in-series module is connected to the relay module, and the relay module is directly connected to the IGBT module, and
the relay control module is configured to control ON or OFF of each relay so as to select one or more in-series module to work with the IGBT module; and
configuring a distribution box directly to connected with the IGBT module and the relay module.

8. The method for heating a battery group according to claim 7, wherein the in-series module comprises:
a first battery group connected with the distribution box via a first relay, which is connected with the first battery group in series;
a plurality of middle battery groups, each middle battery group connected with the distribution box via a second relay, which is connected with the middle battery group in series, and connected with the IGBT module via a third relay, which is connected with the middle battery group in series; and
a last battery group connected with the IGBT module via a fourth relay, which is connected with the last battery group in series.

9. The method for heating a battery group according to claim 7, wherein the at least two in-series modules includes an in-series module having a maximum voltage and an in-series module having a minimum voltage connected in parallel.

10. The method for heating a battery group according to claim 7, wherein each in-series module is configured to comprise a first battery group and a second battery group connected in series.

11. The method for heating a battery group according to claim 7 further comprising:
configuring a relay control module to control ON or OFF of each relay so as to connect a first battery group in a first in-series module to the distribution box directly and to connect a second battery group in the first in-series module to the distribution box via the IGBT module.

12. The method for heating a battery group according to claim 7, comprising:
configuring a relay control module to control ON or OFF of each relay so as to connect a first battery group in a first in-series module to the distribution box directly, and to connect a second battery group in a second in-series module to the distribution box via the IGBT module, wherein the first battery group in the first in-series module, a second battery group in the first in-series module, a first battery group in the second in-series module and the second battery group in the second in-series module are connected in series.

13. The method for heating a battery group according to claim 7, wherein the relay includes an electromagnetic relay.

14. The method for heating a battery group according to claim 7, wherein the relay control module includes a single-chip microcomputer.

15. The method for heating a battery group according to claim 7, wherein two adjacent in-series modules are connected via a relay.

* * * * *